Sept. 2, 1941. T. STIEBEL 2,254,330
ELECTRIC IMMERSION HEATER
Filed Aug. 22, 1938 3 Sheets-Sheet 1
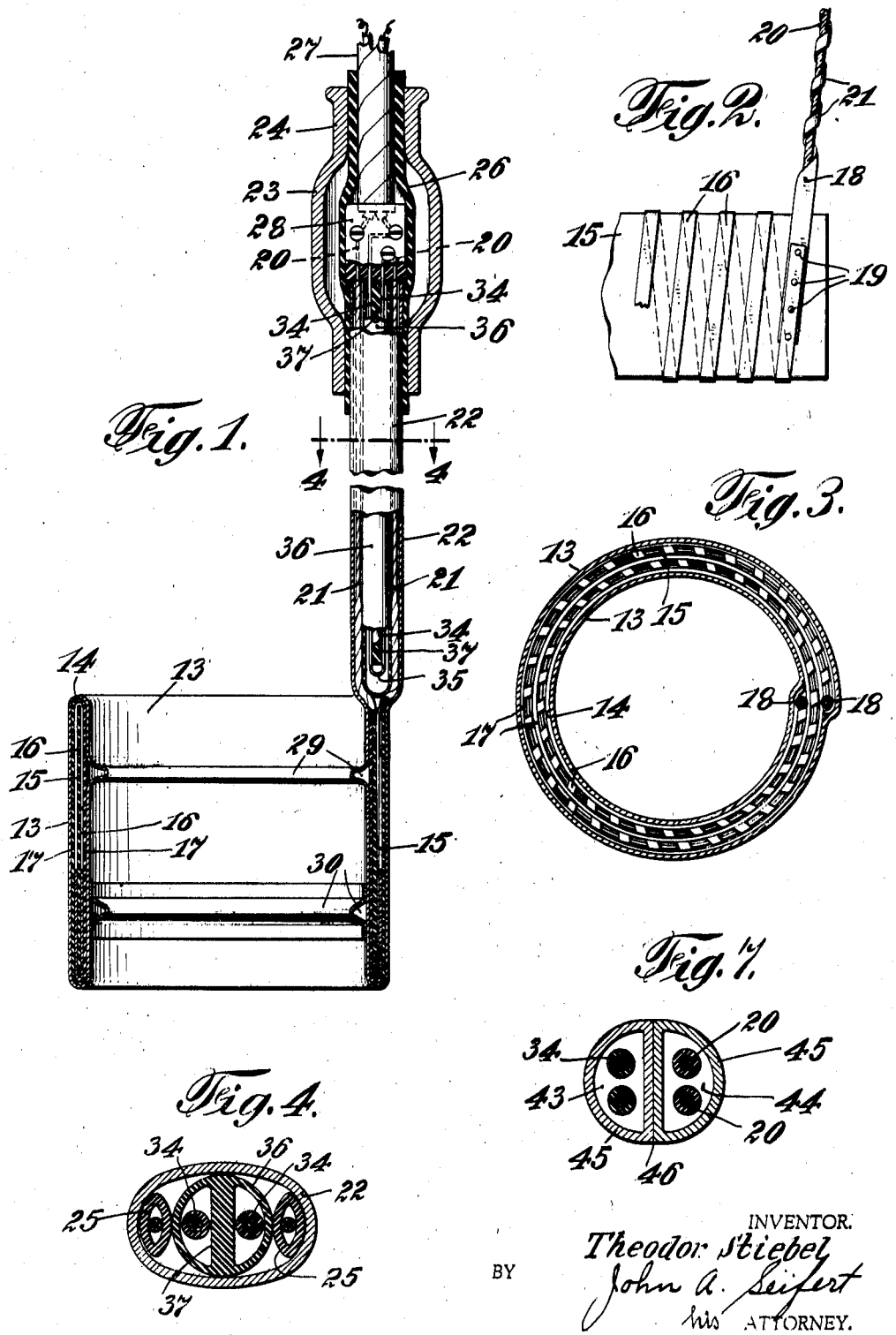

Sept. 2, 1941.   T. STIEBEL   2,254,330
ELECTRIC IMMERSION HEATER
Filed Aug. 22, 1938   3 Sheets-Sheet 2
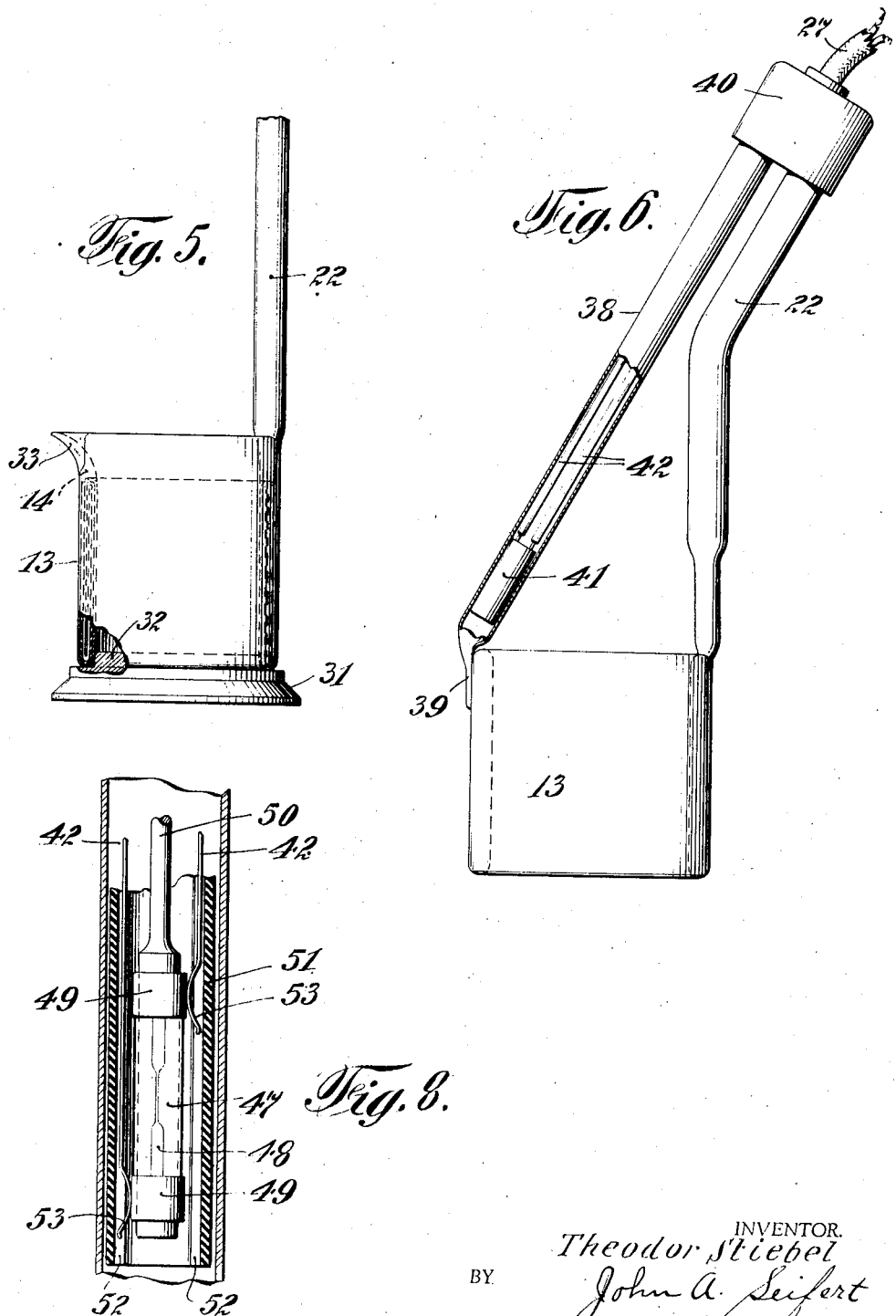
INVENTOR.
Theodor Stiebel
BY John A. Seifert
his ATTORNEY.

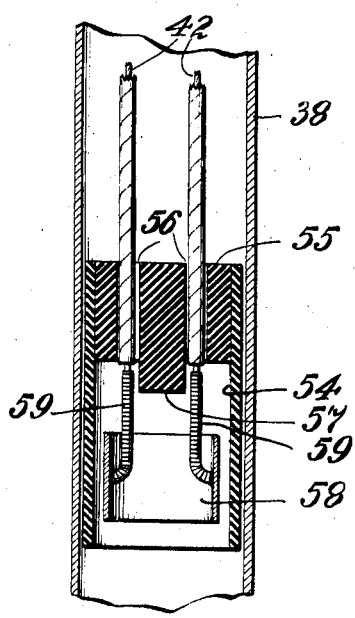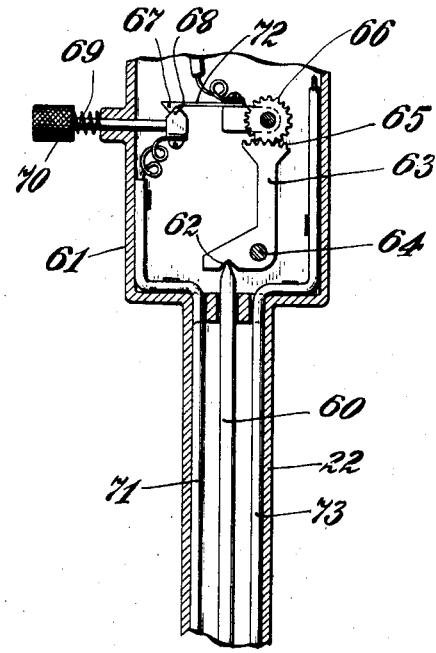

Patented Sept. 2, 1941

2,254,330

UNITED STATES PATENT OFFICE 2,254,330

ELECTRIC IMMERSION HEATER

Theodor Stiebel, Berlin-Tempelhof, Germany

Application August 22, 1938, Serial No. 226,101

12 Claims. (Cl. 219—41)

This invention relates to electric immersion heaters having an electric heating element mounted and electrically insulated in the hollow wall of a cylindrical carrier.

It is an object of the invention to provide said heaters with means to facilitate the handling of the same and prevent short circuiting of the heating element.

It has been found that immersion heaters are usually destroyed long prior to their ordinary life by operating them in dry condition due to the liquid, in which they are immersed, boiling off through the absence or neglect of the user. It has also been found that the operation of immersion heaters in said dry condition has been the cause of fires.

It is another object of the invention to provide an immersion heater with novel features which will prevent the destruction of the heater through the neglect or absence of the user.

It has been further found that the life of an immersion heater has been shortened due to an inherent weakness in the connection between the heating element and the electric conductors leading from a source of electricity.

It is a further object of the invention to overcome this disadvantage by strengthening this connection through the provision of a novel connection having a resistance value intermediate the resistance values of the heating element and conductors.

It is a further object of the invention to provide a heating element whereby the resistance thereof will increase materially when a predetermined temperature has been attained to reduce the heat output of the heating element.

It is a further object of the invention to provide an immersion heater of small dimensions having a very low heat output.

It is a further object of the invention to adapt an immersion heater as a receptacle or beaker.

A further object of the invention is to provide temperature responsive or fusible means in conjunction with an immersion heater operative by a predetermined temperature of the heater to open the circuit of the heating element thereof and prevent destruction of the heater by a high temperature.

A still further object of the invention is to provide an immersion heater with switch mechanism to automatically open the circuit of the heating element when the heater is in inoperative position.

Further objects and advantages of the invention will be set forth in the detailed description of the invention.

In the drawings accompanying and forming a part of this application,

Figure 1 is a side sectional view of an immersion heater forming an embodiment of the invention, and showing means for reinforcing the inner wall of the heater, and a handle for the heater adapted as a carrier or mounting means for electric supply conductors, temperature responsive or fusible means for preventing the heating of the heater above a predetermined temperature, and switch mechanism operative by the position of the heater.

Figure 2 is a fragmentary view of an electric heating element showing the novel connection between the heating element and an electric supply conductor.

Figure 3 is a cross sectional view, on an enlarged scale, of an immersion heater of small dimensions and low heat output, and showing the mounting of an electric heating element in a casing therefor.

Figure 4 is a cross sectional view of the handle showing the manner of insulating electric supply conductors therein.

Figure 5 is a cross sectional view of the immersion heater arranged in the form of a receptacle.

Figure 6 is an elevational view of the immersion heater showing an additional tubular member for supporting temperature responsive or fusible means to prevent energization of the heating element above a predetermined temperature.

Figure 7 is a cross sectional view of a modified form of handle for separating the electric supply conductors and the temperature responsive or fusible means.

Figure 8 is a fragmentary view in section of the handle showing a modified form of fusible means and manner of mounting the same to facilitate removal and replacement of said fusible means.

Figure 9 is a fragmentary view in section of the handle showing a modified form of fusible means adapted for use in places subject to the danger of explosion.

Figure 10 is a fragmentary view in section of the handle and a hand grip portion arranged with switch mechanism adapted to be actuated by a thermostat device operative by a predetermined temperature of the heater; and Figures 11 and 12 are fragmentary views in section of the handle showing the automatic switch mechanism in operative and inoperative positions, respectively.

In accordance with the disclosure of the accompanying drawings, the immersion heater comprises a casing 13 in the form of a double walled member having the space between the walls closed at both ends of the member to form a closed annular chamber, as indicated at 14 in Figures 1 and 5. An electric heating element is mounted in said chamber 14, comprising a rectangular plate 15 of insulating material, such as mica, and a resistance wire 16 wound helically around the plate 15 with the opposite ends of the resistance wire terminating at the opposite ends of the plate and constituting the terminals of the heating element. The heating element is formed to cylindrical shape and placed in the chamber 14 with sheets of insulating material, such as mica, covering the resistance wire and insulating said wire from the opposed walls of the casing 13, as at 17 in Figure 1.

The heating element 15, 16, 17 may be engaged in the casing 13 by various methods, such as, forming the casing 13 from a flat tubular strip or ribbon, engaging the heating element consisting of the plate 15, resistance wire 16 and insulating sheets 17, in the hollow of the tubular strip, forming the assembled parts to circular shape with the opposite end edges abutting and attaching the abutting edges in any suitable manner, such as welding. The heating element 15, 16, 17 may also be engaged in the casing 13 in the manner disclosed in my Patent No. 2,060,644 patented November 10, 1936, wherein a tubular sheet of metal is folded intermediate the ends thereof to form a double walled cylindrical member having one end of the space between the walls closed and the opposite end open, the heating element is formed to cylindrical shape and engaged in the space between the double walls through the open end, and then the open end is closed.

To prevent the formation of insulating layers of air in the chamber 14, the thickness of the heating element 15, 16, 17 is substantially the same as the width of said chamber, whereby it is necessary to forcibly engage the heating element in the chamber, which will force the greater portion of the air from said chamber, and after the heating element is completely engaged in the casing, radial pressure is applied to the inner wall to expel all of the remaining air from the chamber 14.

To prevent the electric resistance wire 16 burning out or prevent the warping of the casing 13 when the heater is maintained in circuit with a source of electricity after the liquid, in which the heater is immersed, has evaporated or boiled off, the resistance wire 16 is constructed from a material having a high temperature coefficient, such as, nickel or iron, or a suitable alloy of both of said metals, and said wire may also contain a mixture of chromium, aluminum, silicon, manganese or other substances. It has been found in connection with the present type of resistance wire that as long as the heater is in a liquid, the emission of heat from the heater is quickly absorbed by the liquid and the temperature of the electric resistance wire is relatively low, such as between 300° and 400°. If the liquid is evaporated, the specific temperature of the resistance wire will increase due to the absence of a proper medium for the transmission of heat from the heater, and the temperature of the resistance wire will rise to above 800°. This rise in the temperature of the present type of resistance wire in a heater being operated in dry condition is prevented by the use of resistance wire having a high temperature coefficient, as the resistance of said wire will be greatly increased when a predetermined temperature is exceeded, and consequently the heat output of the wire will be considerably smaller. If for example, the heat output of a wire having a high temperature coefficient is one kilowatt when the heater is immersed in a liquid, said heat output will fall to approximately 600 watts when the liquid has boiled off, and thereby the wire will be protected from burning out and the casing 13 will be saved from destruction.

To provide a better electric resistance and facilitate the winding of the same on the carrier plate 15, the resistance wire 16 is of band shape, as shown in Figure 2.

In the present practice of constructing immersion or other types of electric heaters, it is customary to connect the terminals of the resistance wire to electric supply conductors by directly uniting or winding the terminals to the supply conductors whereby a great variation in the electrical conductivity and temperature will occur at these points of connection, which will cause the rapid destruction of the connection and render the heater useless. If the new type of electric resistance wire having a high temperature coefficient is connected to supply conductors of copper wire by the present method, there will occur an extensive scaling or corroding of the copper wire and a mechanical strain on the resistance wire at the point of connection.

These disadvantages of the present method of connecting the resistance wire of an electric heater with supply conductors are overcome by providing connecting means intermediate the terminals of the resistance wire and the supply conductors. This intermediate connecting means comprises a band 18 of electric conducting material having an electric resistance value intermediate the corresponding electrical values of the electric supply conductors and the resistance wire 16. An end portion of a band 18 is fixed to each of the terminal ends of the resistance wire 16, as by spot welding as indicated at 19 in Figure 2, and the opposite ends of said bands are wound or twisted about electric supply conductors in the form of copper stranded wire 20, the winding being indicated at 21. To provide a band 18 having a different resistance than the electric resistance wire 16, the band may be formed of nickelin or the band may be of greater width than the wire 16, as shown in Figure 2. By the use of the connecting bands 18, there will be a gradual transition or change in temperature between the conductors 20 having a low temperature, the connecting bands 18 of an intermediate temperature which is higher than the temperature of the conductors 20, and the resistance wire 16 having a heating temperature which is higher than the temperature of the connecting bands 18 and conductors 20.

Sometimes it is necessary to construct small size immersion heaters having a very low heat output, whereby the electric resistance of the heating element must be very great. This object is attained by providing a resistance wire of great length. In the heretofore known construction of immersion heaters wherein a rectangular heating plate is extended once around the periphery of a cylindrical supporting wall, it would be impossible to construct a small size heater, as an increase in length of the heating plate will necessitate an increase in the circumference of the supporting wall. This object of increasing the length of the resistance wire without increasing the outer contour of the heater is accomplished by decreasing the diameter of the inner wall of the casing 13 carrying the heating element 15, 16, 17 without changing the diameter of the outer wall, whereby the closed chamber 14 will be of greater width, as shown in Figure 3. The length of the plate 15 supporting the resistance wire 16 should be sufficient to support the increased length of the resistance wire 16, and the annular space 14 of the carrier 13 is of a width to accommodate several windings of the heating element 15, 16 as shown in Figure 3. The length of the heating element relative to the circumference of the annular space 14 is such as to position the terminal or connecting bands 18 in opposed relation to each other on opposite sides of an interposed layer of the heating element. One of the insulating sheets 17 is of a length slightly greater than the length of the supporting plate 15 and is engaged on the inner side of the convolutions thereof, while the other sheet 17 is of a length to extend as a continuously circular insulating wall between the outer wall of the casing 13 and the outer convolution of the heating element 15, 16, whereby the heating element will be completely insulated from the casing 13.

To facilitate the handling of the immersion heater and provide a carrier for the electric supply conductors 20, the casing 13 is arranged with a handle in the form of a tubular member 22 having one end connected to one end edge of the casing 13 as by solder or welding, with the bore of the member 22 in communication with the annular chamber 14 to permit the connection between the conductors 20 and bands 18, as shown in Figure 1. The opposite end of the handle member 22 is arranged with a hand grip having an enlarged hollow body portion 23 and reduced portions 24 at the opposite ends, one of said reduced portions 24 being engaged on the handle member 22. The handle member 22 may be constructed of a material which is a poor conductor of heat, for example any of the so-called cold metals, to prevent the heating of the handle by the heating element and consequently burning the hands of the user. To properly insulate the handle member 22 from the conductors 20, each conductor is wound with sheets of flexible insulating material, such as mica, and the wound insulating material is pressed together, as shown at 25 in Figure 4. This method of insulating the conductors 20 is particularly advantageous when the body portion of the handle member 22 is elliptical in cross section, as shown in Figure 4, or said member is bent throughout its length or at one point. This advantage is emphasized when tubes of rigid material, such as ceramic material, are used to insulate the conductors 20, as it will be impossible to extend said tubes past the bends in the handle member 22 without using short lengths of said tubes. The use of short lengths of ceramic tubes will result in the forming of gaps between said lengths which will leave the conductors at said gaps exposed to the handle member. Furthermore, the size of the ceramic tubes to encircle each conductor will occupy a greater portion of the bore of the handle member and would not provide a proper air space between the conductors and handle member. It will be seen in Figure 4 that there is provided a large air space or gap between the conductors 20 and the handle member 22 by the use of cylindrical mica 25 as an insulator for the conductors 20.

The handle member 22 or the conductors 20 extending from the hand grip end thereof may accidentally fall into the liquid which is being heated, and the liquid on the handle or conductors may enter the chamber 14 through the handle and short circuit the heating element. It is an object of this invention to prevent the occurrence of this short circuiting by providing a seal in the handle member comprising a tubular member or sleeve 26 of resilient and waterproof material, such as rubber, and of a diameter to tightly embrace the end of the handle member engaged in a reduced portion 24 of the hand grip 23 and the end of an insulating conduit 27 for the conductors 20 engaged in the other reduced portion 24. To facilitate the connecting of the heating element 15, 16 to a source of electricity, the conductors 20 are separated and connected in the hand grip 23 by a connector block 28 located in the hand grip between the handle 22 and conduit 27. The sleeve 26 is of a length to extend through the opposite reduced end portions 24 and encircle the handle 22, conductors 20, connector block 28 and conduit 27, whereby liquid on the conduit 27, hand grip 23 or handle 22 will not enter the casing 13. The sleeve 26 may be formed of two separate sections, one section engaging the conduit 27 and the adjacent portion of the connector block 28 and the other section engaging the handle 22 and the adjacent portion of the connector block 28, with the inner ends of said sections overlapping and secured by an adhesive. The sleeve 26 will also insulate the terminal ends of the conductors 20 and contacts of the connector block 28 from the hand grip 23.

To still further prevent the destruction of the heater when the resistance wire 16 thereof remains energized after the liquid has boiled off, the inner wall of the casing 13 may be constructed from a different material than the outer wall of said casing, and said material of the inner wall having an expansion coefficient greater than the expansion coefficient of the material of the outer wall. This construction will prevent the formation of air spaces in the chamber 14 by assuring a sufficient surface pressure on the heating element 15, 16, 17 by the outer and inner walls of the casing 13 even when the heating element reaches an extremely high temperature, because the inner wall having a higher expansion coefficient than the outer wall will expand correspondingly with an increase in the temperature thereof, whereby the pressure of the inner wall will become greater rather than diminish. In constructing a casing 13 having the walls of different materials, there are provided two tubular members of different diameters corresponding to the diameters of the outer and inner walls and the opposite end portions of said members are rolled and secured to each other to form the chamber 14, the member of smaller diameter having an expansion coefficient greater than the member of larger diameter.

This object of providing the casing 13 with an inner wall which will not buckle from the outer wall and permit the formation of air spaces in the chamber 14 when said walls are subjected to an extremely high temperature may be attained, when the casing is constructed from one material, by reinforcing or stiffening the inner wall.

The inner wall is reinforced by arranging circular folds therein as shown at the upper end portion of the casing 13, as at 29 in Figure 1, and the folds 29 may be in the form of spirals instead of being circular. The inner wall may also be reinforced by separate annular rib members 30 secured to the inner circumference of the inner wall in any suitable way, as by welding or soldering, as shown at the lower end portion of the casing 13 in Figure 1.

A cylindrical heater constructed in the manner hereinbefore described may readily be converted into an electric heating receptacle or beaker by closing the end of the heater casing opposite the end arranged with the handle 22. This is accomplished by providing a plate having at one face thereof a flat supporting base of greater diameter than the outer diameter of the casing 13 to impart stability to the receptacle, as shown at 31 in Figure 5, and the opposite face of the plate is reduced to form a circular protuberance adapted to tightly engage the inner wall of the casing 13, as at 32. A portion of the upper edge of the casing 13 diametrically opposite the handle 22 may be arranged as a pouring spout 33 to facilitate the emptying of hot liquid from the receptacle thus formed by the plate 31, 32.

To further prevent the destruction of the heater by operating the same in dry condition, there is provided means interposed in the circuit of the heating element 16 and mounted in the handle 22 adjacent the casing 13 to be actuated by a predetermined temperature of the heating element to break or open the circuit of the heating element and adapted to be readily introduced into the handle at the outer end thereof. This means may be a temperature sensitive fuse, or a thermostatically operative contact maker or switch. In Figure 1 there is disclosed a temperature sensitive fuse device comprising a U shaped wire 34 arranged at the U portion with fusible material, as indicated at 35, adapted to be fused or melted by a predetermined temperature, and the wire being mounted in the handle 22 to position the fusible portion 35 adjacent the juncture between the handle and chamber 14. The wire is connected to the appropriate contacts of the connector or junction block 28. To facilitate the removal and replacement of the destroyed or fused wire 34, said wire is mounted in a tube 36 of insulating material closed at one end with the fusible portion 35 positioned at the closed end of the tube, so that the fused material may drop into said closed end, and the leg portions of the wire 34 are insulated and separated from each other by an insulating wall 37 fixed to the opposite sides of the tube. The tube 36 is adapted to be releasably mounted in the upper end of the handle 22 below the hand grip 23. When the temperature of the heating element reaches the predetermined degree, the fusible material 35 is fused and the circuit of the heating element 16 will be opened thereby preventing destruction of the heater by an extremely high temperature.

It has been found that the hottest point in the immersion heater is at that portion of the heater diametrically opposite the handle, and therefore, this hot point in the heater is the proper place to mount the fusible and thermostat means. This purpose is accomplished by providing a tubular member 38 closed at one end and said end arranged to be attached to the casing 13 in heat conducting contact therewith, as by welding or soldering, as at 39 in Figure 6, and in opposed relation to the handle 22. The opposite end of the tubular member 38 is connected to a hand grip or knob 40 to which the handle 22 is also attached in lieu of the hand grip 23. In Figure 6, the fusible member is shown in the form of a cartridge 41 adjacent to the closed end of the tubular member 38 having a fusible element therein electrically connected in the circuit of the heating element 16 by conductors 42 connected to the conductors 20 in the knob 40.

Figure 7 illustrates another method of mounting the fusible means in the handle 22 which will eliminate the use of the tube 36 by dividing the handle 22 into two passages 43, 44 for the U shaped wire 34 and conductors 20, respectively. These passages may be formed by inserting a wall portion in the handle 22 or by uniting two semi-circular tubes 45 at their flat sides, as at 46. The tubes 45 are mounted on the end of the casing 13 in the manner hereinbefore described, with the passage 44 in communication with the chamber 14.

To facilitate the engagement of a fusible member in its carrier 22 or 42 by the user and provide an automatic connection of said member in circuit with the heating element without the necessity of manually connecting the wires of the fusible element with the contacts of the connector 28, there is shown in Figure 8, a replaceable fuse cartridge comprising a receptacle 47 having a fusible wire 48 mounted therein and electrically connected to two ring contacts 49 encircling the receptacle at the opposite ends thereof. One end of the receptacle is arranged with a finger manipulating stem 50. The handle 22 or tubular member 38 is arranged with a tube 51 of insulating material, such as ceramic material, having a comparatively thin wall and a pair of opposed recesses 52 extending the length of the tube for the mounting of the wire 34 or conductors 42 and resilient arcuate contacts 53 connected to the leg portions of the wire 34 or conductors 42 and mounted at different levels, so that the arcuate portions will project into the bore of the tube 51 and engage the ring contacts 49. The stem 50 is of sufficient length to extend to the outer end of the handle 22 or tubular member 38 and be readily grasped by the fingers of the user for the purpose of removal of a receptacle 47 having a fusible wire 48 which has been destroyed by the predetermined heat of the heating element.

Figure 9 shows a fusible element which is very sensitive and adapted particularly for heaters used in technical operations, such as places subject to the danger of explosion, whereby it is necessary to provide a fusible element which will readily be affected by the heat from the exterior thereof and in which the fusible material will dissipate in a drop in every position of the fusible element. To accomplish these results, there is provided a tubular member 54 of insulatinng material, such as ceramic material, mounted in the handle 22 or tubular member 38 having the end adjacent the hand grip 23 or 40 closed by a disk 55 having a pair of openings 56 for the passage of the conductors 42, and the portion of the disk separating the openings 56 being extended beyond the inner face of the disk, as at 57 in Figure 9. A ring 58 of electric conducting material, such as copper, is tightly engaged in the tubular member 54 adjacent the end opposite the closed end, and having fusible elements 59 connected at one end to the ring 58 and extended along the axis of the tubular member 54 toward the disk 55 on opposite sides of the extended portion 57 to be connected to the conductors 42. The portion 57 will prevent bridging of the fusible elements 59 and assure the separation of the fused material. The ring 58 will readily absorb the temperature of the heating element and transmit said temperature to the fusible elements 59, and the space between fusible elements will assure the complete separation of the fused material and opening of the circuit of the heating element.

A further embodiment of means for opening the circuit of the heating element to prevent injury thereof by a high temperature comprises a temperature responsive means mounted in the handle 22 adjacent to the casing 13 to be operative by said high temperature of the heating element to close the circuit of an electromagnet adapted to actuate means arranged in an electric connection plug adapted to be releasably engaged in a contact receptacle arranged in the handle 40, whereby the electromagnetic actuated means automatically expels the plug from the contact receptacle when a temperature injurious to the immersion heater is attained. The electromagnetic operative means may be inserted by hand or may be replaced in operative position simultaneously with the engagement of the connection plug with the contact receptacle. The eletcromagnetic actuated means may consist of a spring influenced plunger maintained in position within the plug by a pawl adapted to be actuated by the electromagnet, and whereby the connection plug is permitted to be engaged in the contact receptacle. If the temperature of the heating element exceeds a predetermined degree, the temperature responsive means operative by said temperature will close the circuit of the electromagnet which will actuate the pawl in position to permit movement of the plunger under the force of the spring and expel the connection plug from the contact receptacle. The connection plug can only be engaged in the contact receptacle when the temperature of the heating element has decreased below the injurious degree and the circuit of the electromagnet is open to permit engagement of the pawl by the plunger.

Figure 10 discloses another method of opening the circuit of the heating element when said element attains a predetermined high temperature, comprising a temperature responsive or thermostat rod 60 mounted in the handle 22 with an end thereof adjacent the casing 13 and the opposite end extending in a hollow hand grip portion 61 fixed on the handle 22 in lieu of the hand grip 23 and communicating with the bore thereof. The end of the rod extending into the hand grip 61 is arranged to engage a recess 62 in an arm of a lever 63 pivotally mounted in the hand grip, as at 64. The end of the other arm of the lever 63 is arranged with an arcuate series of gear teeth, as at 65, to mesh with a pinion 66 rotatably mounted in the hand grip. A switch mechanism is mounted in the hand grip comprising a triangular contact block 67 connected to the pinion 66 and adapted to engage another triangular contact block 68 slidably mounted in the wall of the hand grip and yieldingly urged toward said wall by a spring 69 compressed between the exterior of the hand grip and a manipulating member 70 connected to the contact block 68. The contact block 68 is connected in circuit with the heating element 16 by a wire 71 and the contact block 67 is connected in circuit with one side of the source of electricity by a wire 72. The other side of the source of electricity is connected to the heating element 16 by a wire 73. To close the circuit of the heating element when the heater is cold, the manipulating member 70 is actuated toward the hand grip 61 to move the contact block 68 past the contact block 67 and the opposite faces of the contact blocks are engaged with each other by the action of the spring 69 which will maintain the block 68 in engagement with the block 67. When the heating element reaches a predetermined high temperature, the thermostat rod 60 will be expanded by said temperature thereby rocking the lever 63 and rotating the pinion 66 to disengage the contact block 67 from the contact block 68 to permit the block 68 to be moved by spring 69 from the block 67 and open the circuit of the heating element.

Sometimes through negligence the heating element remains in circuit with the source of electricity after the heater has been removed from the hot liquid, and it is a further object of the invention to provide a switch in the circuit of the heating element which will be actuated by the position of the handle. Means for accomplishing this object is illustrated in Figures 11 and 12, and comprises a mercury switch in the form of an elongated sealed receptacle 74 mounted in the handle 22 and having contacts 75, 76 fixed in the opposite ends thereof, the contact 75 extending into the receptacle beyond the transverse center thereof and electrically connected to one side of the source of electricity. The other contact 76 only extends a short distance into the receptacle 74 spaced from the contact 75 and electrically connected to the heating element 16. The contacts 75, 76 are interposed in one of the conductors 20. The receptacle 74 contains a quantity of mercury or other suitable electric conducting liquid whereby the contacts 75 and 76 are engaged by said liquid when the heater is positioned in a vertical plane, as shown by the level of the liquid at 77 in Figure 11, whereby the circuit of the heating element is closed, and the conducting liquid will only engage contact 76 when the heater is not in vertical position, as shown by the level of the liquid at 78 in Figure 12, whereby the heating element is disconnected from the source of electricity.

Having thus described my invention, I claim:

1. In an electric immersion heater, a double walled cylindrical member having the space between the walls closed at both ends of the member, and an electric heating element comprising a flexible plate of electric insulating material and of a length not less than twice the circumference of the space between the walls of the cylindrical member, a resistance wire wound helically around the flexible plate with the opposite ends thereof terminating at the opposite ends of the plate, and sheets of electric insulating material on opposite sides of the flexible plate to cover the resistance wire, the electric heating element being wound several times in the space between the walls of the cylindrical member with the terminal ends of the resistance wire in opposed relation to each other on opposite sides of an interposed layer of the heating element.

2. In an electric immersion heater, a double walled cylindrical member having the space between the walls closed at both ends of the member, and an electric heating element mounted in the space between the walls of the cylindrical member, the inner wall of the cylindrical member having a coefficient of expansion greater than the coefficient of expansion of the outer wall, whereby the inner wall will exert a variable pressure on the heating element and outer wall adapted to be changed correspondingly with a change in temperature of the heating element.

3. In an electric immersion heater, a double walled cylindrical member having the space between the walls closed at both ends of the member, and an electric heating element mounted in the space between the walls of the cylindrical member, the inner wall being arranged with reinforcing means to prevent warping of the same when the heater is operated in the dry condition.

4. In an electric immersion heater, a double walled cylindrical member having the space between the walls closed at both ends of the member, an electric heating element engaged in the closed space between the walls of the cylindrical member, a tubular member fixed to one end of the cylindrical member having the bore thereof in communication with the space between the walls of the cylindrical member, a hollow hand grip having restricted openings at the opposite ends, one of said openings being engaged on the free end of the tubular member, a cable for electric conductors leading from a source of electricity engaged in the other restricted opening of the hand grip, electric conductors connected to the heating element and passed through the tubular member into the hand grip, a connector within the hand grip adapted to connect the conductors carried by the cable with the conductors connected to the heating element, and a flexible sleeve of water-proof material engaged about the connector with the opposite end portions of the sleeve projecting from the restricted openings of the hand grip and embracing the cable and tubular member to prevent liquid entering the cylindrical member through the tubular member.

5. In an electric heater, a double walled cylindrical member having the space between the walls closed at both ends of the member and one end of the member being arranged with a pouring spout, an electric heating element mounted in the closed space between the walls of the cylindrical member, a tubular handle member fixed to the spout end of the cylindrical member in spaced relation to the spout and having the bore thereof in communication with the space between the walls of the cylindrical member for carrying electric conductors from a source of electricity to the heating element, and a plate having a reduced portion at one face adapted to be firmly engaged in the end of the cylindrical member opposite the end arranged with the spout and handle member to form a heating container.

6. In an electric immersion heater, a double walled cylindrical member having the space between the walls closed at both ends of the member, an electric heating element mounted in the closed space of the cylindrical member, a tubular member having the bore divided into two passages and mounted on one end of the cylindrical member with the passages thereof in communication with the space between the walls of the cylindrical member immediate of the mounting of the tubular member on the cylindrical member, electric conductors in circuit with a source of electricity passed through one passage of the tubular member and connected to the heating element, and means mounted in the other passage of the tubular member electrically connected in the circuit of the heating element and operative to open said circuit by a predetermined temperature of the heating element.

7. In an electric immersion heater, a double walled cylindrical member having the space between the walls closed at both ends of the member, an electric heating element mounted in said closed space of the cylindrical member, a tubular member mounted on one end of the cylindrical member and having the bore thereof in communication with the closed space of the cylindrical member, electric conductors in circuit with a source of electricity passed through the tubular member and connected to the heating element, and temperature sensitive means comprising a tube of electric insulating material closed at one end mounted in the tubular member with the closed end adjacent the juncture of the tubular member with the cylindrical member to divide the tubular member into two passages and a U shaped conductor electrically connected in the circuit of the heating element and arranged at the U portion with fusible material, the U shaped conductor being mounted in the tube with the fusible portion at the closed end and adapted to open said circuit of the heating element by a predetermined temperature of the heating element.

8. In an electric immersion heater, a cylindrical member having a closed annular chamber, an electric heating element mounted in the annular chamber, a tubular member mounted on one end of the cylindrical member and having the bore thereof in communication with the annular chamber, electric conductors leading from a source of electricity passed through the tubular member and connected to the electric heating element, a second tubular member having one end closed and fixed at said closed end to a portion of the cylindrical member in diametrically opposed relation to the first tubular member, the opposite end of the second tubular member being in communication with the first tubular member, and a fusible member mounted in the closed end portion of the second tubular member electrically connected in the circuit of the heating element and operative by a predetermined temperature of the heating element to open the circuit of said heating element.

9. In an electric immersion heater as claimed in claim 8, a tube of electric insulating material having diametrically opposed longitudinal recesses in the bore thereof and mounted in the second tubular member, a pair of resilient contact members mounted in the recesses of the tube to extend into the bore of said tube at different levels and connected in the circuit of the heating element, and the fusible member comprising a receptacle having spaced contact portions on the exterior thereof adapted to engage the contact members, a stem extended longitudinally from one end to facilitate the engaging of the contact portions of the receptacle with the contact members of the tube exteriorly of the second tubular member and a fusible wire mounted in the receptacle in circuit with the contact portions thereof and adapted to be fused by a predetermined temperature of the heating element to open the circuit thereof.

10. In an electric immersion heater as claimed in claim 8, a tube of electric insulating material having a closure in one end arranged with spaced passages and the portion of the closure separating the passages projecting into the tube, said insulating tube being mounted in the second tubular member, a ring of electric conducting material mounted in the insulating tube adjacent the end opposite the closed end of the tube, and the fusible member comprising a pair of fusible wires connected at one end to the conducting ring and the opposite ends connected by conductors passed through the passages of the closure in the circuit of the heating element, said opposite ends of the fusible wires being separated by the portion of the closure projecting into the tube, whereby the fused material of the fusible wires will separate from the conductors and open the circuit of the heating element.

11. In an electric immersion heater, a cylindrical member having a closed annular chamber, an electric heating element mounted in the annular chamber, a tubular handle fixed at one end on the cylindrical member with the bore of the handle in communication with the annular chamber, electric contacts mounted in the opposite end of the handle having electrical connection with the heating element, an electric connection plug connected in the circuit of a source of electricity and adapted to releasably engage the contacts in the handle, means mounted in the connection plug and operative to engage the handle and force the plug out of engagement with the contacts, an electromagnet adapted to actuate the plug expelling means and temperature responsive means mounted in the handle adjacent the cylindrical member and adapted by a predetermined temperature of the heating element to close the circuit of the electromagnet and force the plug out of engagement with the contacts, whereby the circuit of the heating element will be disconnected from the source of electricity.

12. In an electric immersion heater, a cylindrical member having a closed annular chamber, an electric heating element mounted in the annular chamber, a tubular handle mounted on one end of the cylindrical member with the bore thereof in communication with the annular chamber, conductors leading from a source of electricity passed through the tubular handle and connected to the heating element, and a sealed receptacle having contacts extended into the receptacle and spaced from each other and an electric conducting liquid contained therein, the receptacle being mounted in the tubular handle with the contacts connected in one of the conductors, and the electric conducting liquid engaging both contacts in the vertical position of the handle and engaging only one contact in the horizontal position of the handle.

THEODOR STIEBEL.